United States Patent
Belloma

(10) Patent No.: US 6,715,442 B1
(45) Date of Patent: Apr. 6, 2004

(54) FISH FEEDER

(75) Inventor: Frank Belloma, Centerville, IA (US)

(73) Assignee: EMF Metal Fabrication, Centerville, IA (US)

( * ) Notice: Subject to any disclaimer, the term of this patent is extended or adjusted under 35 U.S.C. 154(b) by 0 days.

(21) Appl. No.: 10/409,243

(22) Filed: Apr. 7, 2003

(51) Int. Cl.$^7$ .......................... A01K 61/02; A01K 39/00
(52) U.S. Cl. .................. 119/51.04; 119/57.1; 119/57.5; 119/57.92
(58) Field of Search .................. 119/51.04, 51.11, 119/51.13, 57.1, 57.5, 57.92

(56) References Cited

U.S. PATENT DOCUMENTS

| | | | | |
|---|---|---|---|---|
| 2,800,256 A | * | 7/1957 | Di Nuzzo ................. | 119/51.04 |
| 3,029,790 A | | 4/1962 | Loudon | |
| D228,141 S | * | 8/1973 | Kitson ....................... | D30/131 |
| 4,603,657 A | * | 8/1986 | Peckskamp .............. | 119/57.92 |
| 4,656,969 A | * | 4/1987 | Rapp et al. ............... | 119/51.11 |
| 5,138,978 A | * | 8/1992 | Reid ......................... | 119/51.04 |
| 5,143,289 A | * | 9/1992 | Gresham et al. ......... | 119/51.11 |
| 5,259,337 A | * | 11/1993 | Rasmussen ................ | 119/57.1 |
| 5,964,184 A | * | 10/1999 | Hart .......................... | 119/57.1 |
| 5,975,021 A | * | 11/1999 | Shingleton et al. ...... | 119/51.04 |
| 6,082,299 A | * | 7/2000 | Halford .................... | 119/51.04 |

* cited by examiner

Primary Examiner—Charles T. Jordan
Assistant Examiner—Elizabeth Shaw
(74) Attorney, Agent, or Firm—Brett Trout

(57) ABSTRACT

A fish feeder having an inner tray sliding within an outer tray. The trays are provided with holes which, when brought into alignment, allow feed to drop from the inner tray through the outer tray and on to a spreader, whereby the food is evenly distributed across the surface of water. The inner tray is driven by pneumatic actuation to reduce noise and precisely control the amount of feed dropped upon each actuation. Means are provided for reducing the ingress of food particulate between the trays, which would otherwise act to increase friction and decrease the efficiency and repeatability associated with food delivery.

20 Claims, 4 Drawing Sheets

FISH FEEDER

BACKGROUND OF THE INVENTION

1. Field of the Invention

The present invention relates to fish feeders, and more specifically, to fish feeders for hatcheries and the like.

2. Description of the Prior Art

It is known in the art to provide elongated fish feeders for hatcheries. U.S. Pat. No. 3,029,790 describes such a feeder, incorporating an inner tray and an outer tray, along with means for actuating the inner tray linearly relative to the outer tray. Both trays are provided with holes in the bottom so that the linear actuation alternately positions the holes into and out of fluid correspondence. Accordingly, when the inner tray is filled with particulate fish food, linear actuation of the inner tray in a first direction opens the holes and drops food through both sets of holes, while linear actuation in the opposite direction cuts off fluid communication of the holes and stops the delivery of food therethrough. The linear actuation is provided by a rotational electric motor, provided with a speed reducer, offset crank and various other mechanical parts. Alternately, the tray may be actuated by hand.

The electrical or manual actuation of the tray is conducted from one end of the inner tray, while the other end of the inner tray is coupled to the outer tray by a spring. The spring biases the tray in the opposite direction from the motive force of the electric or manual actuation of the inner tray. The spring also forces the inner tray into the outer tray to prevent particular food material from becoming lodged between the trays.

One drawback associated with the manual operation of such trays is the time-consuming and inconsistent nature of such actuation. A drawback associated with utilization of a rotational electric motor in combination with a speed reducer, power shaft, offset crank, pitman threaded eye, pin, threaded shank and lock nut is the cost, maintenance, weight and bulk of such a collection of materials. Although it is known in the art to provide a solenoid and spring system to actuate the inner tray, to provide a solenoid with sufficient power to actuate the inner tray generates noise levels requiring the use of hearing protection in their vicinity.

Another drawback associated with the prior art is the use of the spring to provide reverse linear actuation. The end of the outer tray must be positioned a distance from the end of the inner tray to allow for the length of the resting spring. This distance requires the outer tray to be extended beyond the length of the inner tray, adding to the weight, cost and dimensions of the prior art feeder. Additionally, the use of springs to linearly actuate the inner tray relative to the outer tray adds additional cost, weight and maintenance to the feeder. It would be desirable to eliminate the need for springs to linearly actuate the inner tray.

Yet another drawback associated with the prior art is the absence of means to prevent the particulate feed from becoming embedded between the sidewalls of the inner tray and the outer tray. Due to the composition of the food, when the food becomes lodged between the trays, the friction therebetween increases greatly, leading to excessive burden on the linear actuator and inconsistencies in terms of feed delivery. It would, therefore, be desirable to provide means for preventing the ingress of particulate food between the sidewalls of the trays.

Yet another drawback associated with the prior art is the inconsistent nature of the feed delivery. Obviously, manual operation of the machine is inconsistent. Similarly, whether the inner tray is actuated with an electric motor and a speed reducer, or an electric solenoid, the motor is typically underpowered to reduce noise levels. While not necessarily a problem when the feeders are new, as particulate becomes lodged between the trays, the trays become harder to move relative to one another, often leaving the motor inadequate to overcome the new frictional forces. This situation often causes the inner tray to move more slowly relative to the outer tray, leading to a longer fluid communication between the holes and a greater food drop. Accordingly, the trays must constantly be adjusted to compensate for the motor's inability to overcome the frictional forces.

Alternatively, if a larger motor is provided, this larger motor increases the weight, cost and maintenance of the system. Additionally, providing a larger electric motor typically causes a sufficient amount of additional noise to mandate the use of ear protection in the vicinity of the feeder. It would therefore be desirable to provide a powerful, consistent actuation of the inner tray, which is also economic in terms of weight, cost and maintenance, and which maintains the noise levels sufficiently low to avoid the use of ear protection. The difficulties encountered in the prior art described hereinabove are substantially eliminated by the present invention.

SUMMARY OF THE INVENTION

In an advantage provided by the present invention, a fish feeder is provided which is of a lightweight, low-cost manufacture.

Advantageously, the present invention provides a fish feeder with low noise production.

Advantageously, the prevent invention provides a fish feeder with a consistent actuation and feed drop.

Advantageously, the prevent invention provides a fish feeder which is compact and low-cost to manufacture.

Advantageously, the prevent invention provides a fish feeder which reduces the instances of particulate feed becoming lodged between the trays of the feeder;

Advantageously, the present invention provides a fish feeder which reduces wasted feed;

Advantageously, the present invention provides a fish feeder which improves water quality;

Advantageously, the present invention provides an even distribution of food across the surface of the water.

The present invention relates to a fish feeder having an elongate tray having a first floor and a pair of sidewalls. A second floor is provided within the tray, with both the first and second floors being provided with a plurality of openings. Means are provided for maintaining the second floor in a substantially parallel orientation with the first floor. A pneumatic cylinder is provided around a shaft coupled to the second floor. A pressurized air supply and exhaust are also coupled to the pneumatic cylinder. Means are provided for directing air from the pressurized air supply to the pneumatic cylinder in a manner which actuates the second floor in opposite directions, sufficient to briefly place the holes in the first floor and second floor in fluid communication to allow a predetermined amount of particulate food resting on the second floor to drop from the fish feeder.

In the preferred embodiment, the second floor is part of an inner tray with sidewalls which extend upward and over the sidewalls of the outer tray to prevent food particulate from passing between the sidewalls of the two trays. Also, the feeder is preferably adjustable to allow the holes in the first floor and second floor to be in greater or lesser fluid communication, thereby dropping greater or lesser amounts of food particulate from the feeder.

BRIEF DESCRIPTION OF THE DRAWINGS

The present invention will now be described, by way of example, with reference to the accompanying drawings in which.

DETAILED DESCRIPTION OF THE PREFERRED EMBODIMENT

Figure 1:
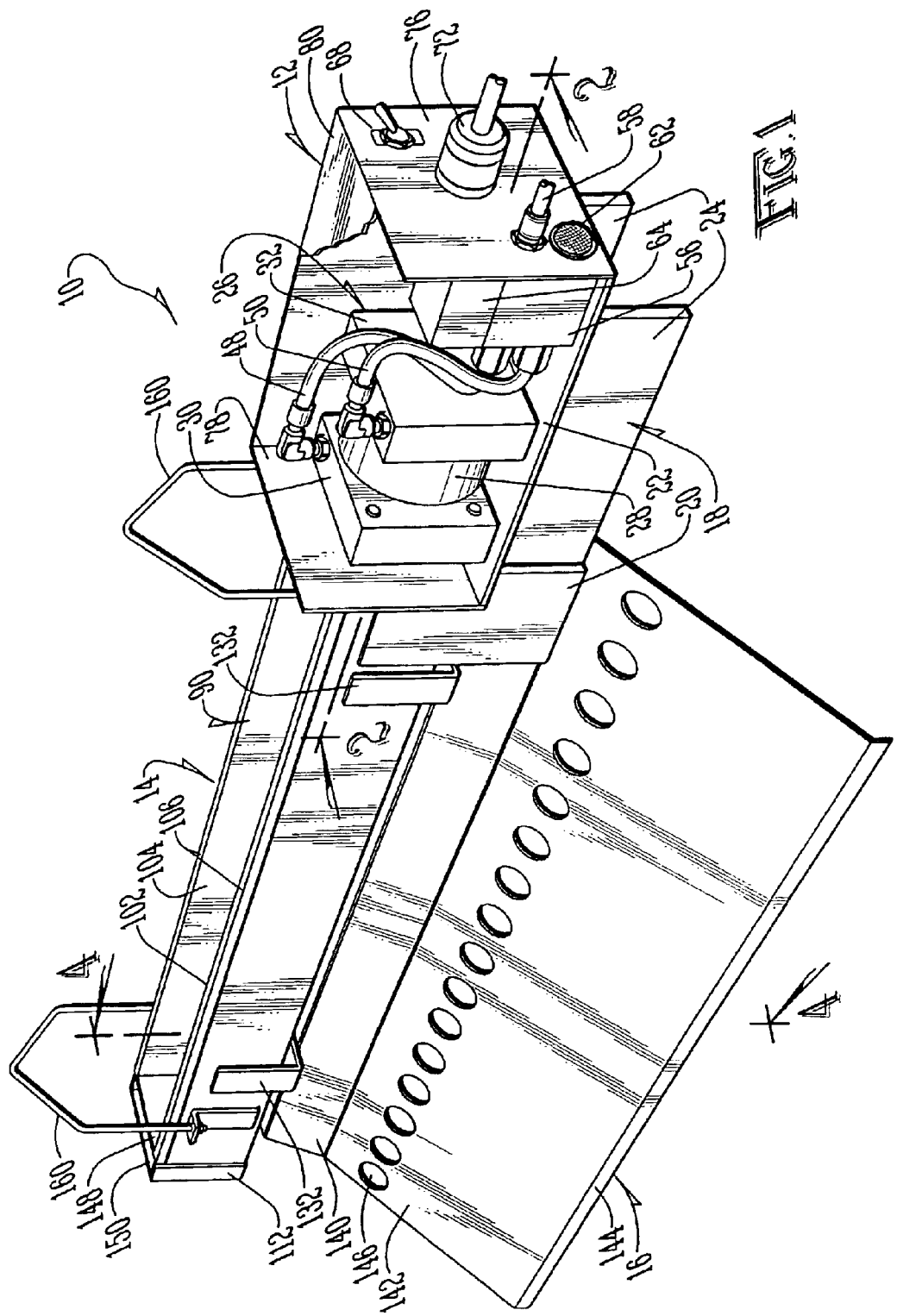
FIG. 1 illustrates a front perspective view, in partial cutaway, of the fish feeder of the present invention.

The fish feeder of the present invention is shown generally as (10) in FIG. 1. As shown in FIG. 1, the fish feeder (10) includes an actuation assembly (12), a feed assembly (14) and a spreader (16). The actuation assembly (12) includes a rigid base (18) constructed of extruded aluminum approximately 0.0625 inches thick and having a generally "U-shaped" cross-section. Bolted, welded or otherwise secured to the base (18) are a pair of brackets (20) constructed of stainless steel or similar material. As shown in FIG. 1, the base (18) includes a base plate (22) coupled to a pair of downward extending legs (24). Provided on the base plate (22) is a pneumatic cylinder (26). While the pneumatic cylinder (26) may, of course, be of any suitable type known in the art, in the preferred embodiment the pneumatic cylinder (26) is a two inch diameter bore, one-half inch stroke, pneumatic cylin.

Figure 2:
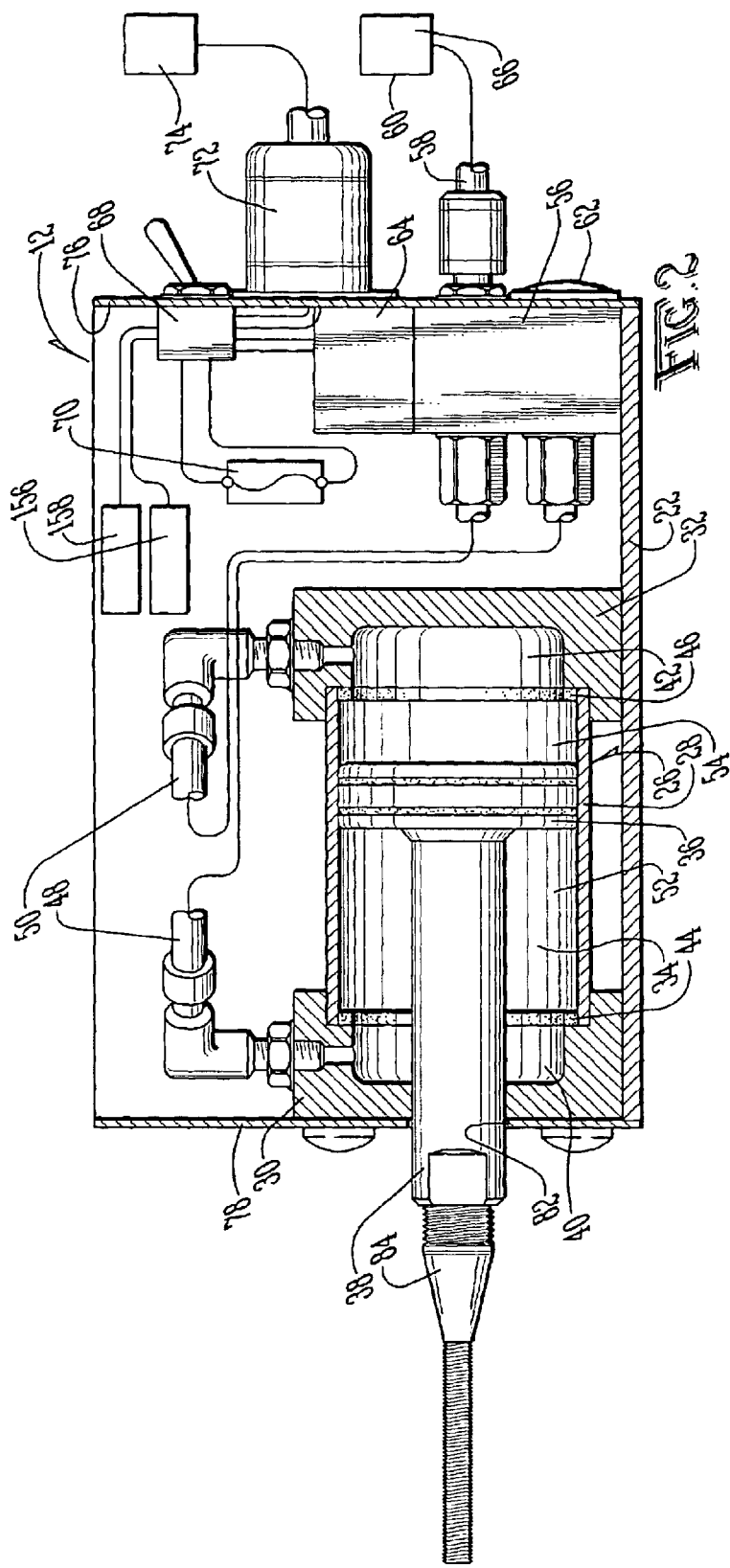
FIG. 2 illustrates a side elevation in cross-section of the pneumatic cylinder, taken along line 2—2 of FIG. 1.

As shown in FIG. 2, the pneumatic cylinder (26) includes a housing (28) constructed of aluminum or similar material. Provided on one end of the housing (28) is a header (30), and provided on the opposite end is a footer (32). The header (30) and footer (32) are preferably constructed of steel or similar material. As shown, the interior (34) of the housing (28) is hollow. Provided within the interior (34) is a piston (36), coupled to a shaft (38).

As shown in FIG. 2, the housing (28) is provided with a head (40) and foot (42). Provided within the interior (34) against the head (40) is an annular damper (44). A similar annular damper (46) is provided against the foot (42). While the dampers (44) and (46) may be constructed of any suitable material, in the preferred embodiment, they are preferably constructed of ¼ inch thick rubber or similar resilient material sufficient to reduce the noise of the actuation of the pneumatic cylinder (26) below 80 decibels, more preferably below 60 decibels, and most preferably below 40 decibels. Extending through the header (30) and housing (28) is a first pneumatic tube (48). Similarly, a second pneumatic tube (50) is provided through the footer (32) and housing (28). As shown in FIG. 2, the first pneumatic tube (48) is in fluid communication with a first chamber (52), while the second pneumatic tube (50) is in fluid communication with a second chamber (54) divided by the piston (36).

As shown in FIG. 2, the pneumatic tubes (48) and (50) are coupled to a pneumatic valve (56), such as those well known in the art. The pneumatic valve (56) is provided with an input tube (58) coupled to a pressurized air supply (60), such as an air compressor, and a filtered exhaust (62). An electronic solenoid (64) is coupled to the pneumatic valve (56) in a manner which causes the solenoid (64) to actuate the pneumatic valve (56) to either direct pressurized air (66) through the first pneumatic tube (48), the second pneumatic tube (50), or to stop the flow of pressurized air (66) to the interior (34) of the housing (28). Wired to the solenoid (64) is a three-position switch (68) which, in turn, is wired to a fuse (70). The switch (68) is also wired to a power supply (72) which, in the preferred embodiment, is a 120 volt 60z plug wired to an outlet (74). The pneumatic valve (56), solenoid (64), switch (68) and fuse (70) are all screwed or otherwise secured to a footplate (76), bolted or otherwise secured to the base plate.

Figure 3:
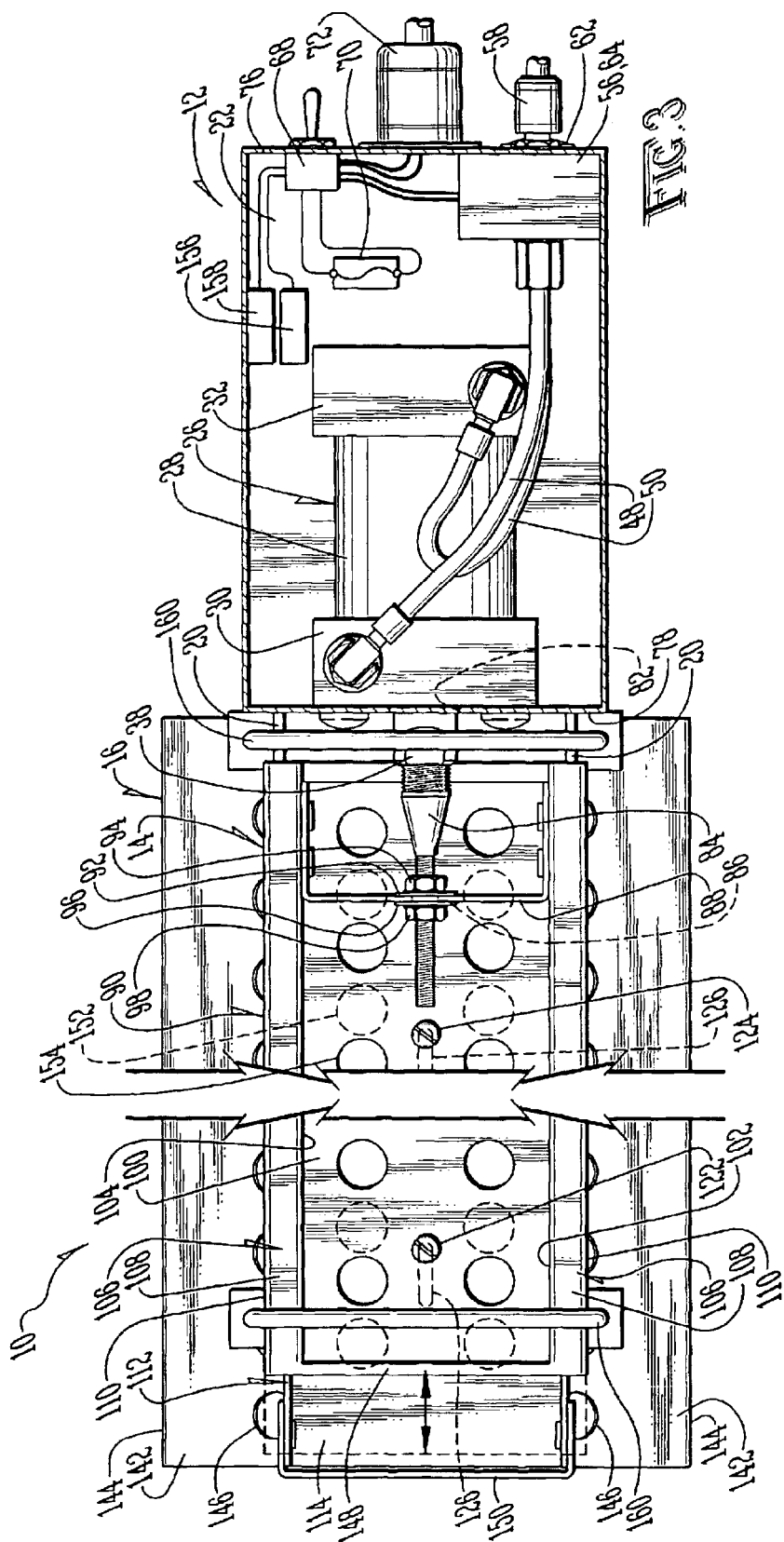
FIG. 3 is a top perspective view of the fish feeder of FIG. 1.

As shown in FIG. 1, also bolted or otherwise secured to the base plate (22) is a faceplate (78) to which the head (30) of the pneumatic cylinder (26) is screwed. Bolted or otherwise secured to the footplate (76) and faceplate (78) is an aluminum cover (80) which protects the actuation assembly (12) from dirt, moisture, and other debris. As shown in FIG. 3, the faceplate (78) is provided with an opening (82) slightly larger than the diameter of the shaft (38). The shaft (38) extends through the opening (82). The shaft (38) is preferably provided with internal threading and threadably receives a tapered connecting shaft (84). The connecting shaft (84) tapers from a ½ inch diameter thread to a ¼ inch diameter thread, which extends through an opening (86) in a foot bracket (88). The foot bracket (88) is preferably four-sided aluminum bracket provided within, and bolted or otherwise secured, to an elongated inner tray (90). The connecting shaft (84) extends through the opening (86) and is secured on either side of the foot bracket (88) by a first washer (92) and first nut (94) and second washer (96) and a second nut (98). The distance of the foot bracket (88) from the end of the shaft (38) may be quickly and easily adjusted by loosening the nuts (94) and (98), adjusting the foot bracket (88) through the opening (86) and retightening the nuts (94) and (98).

Figure 4:
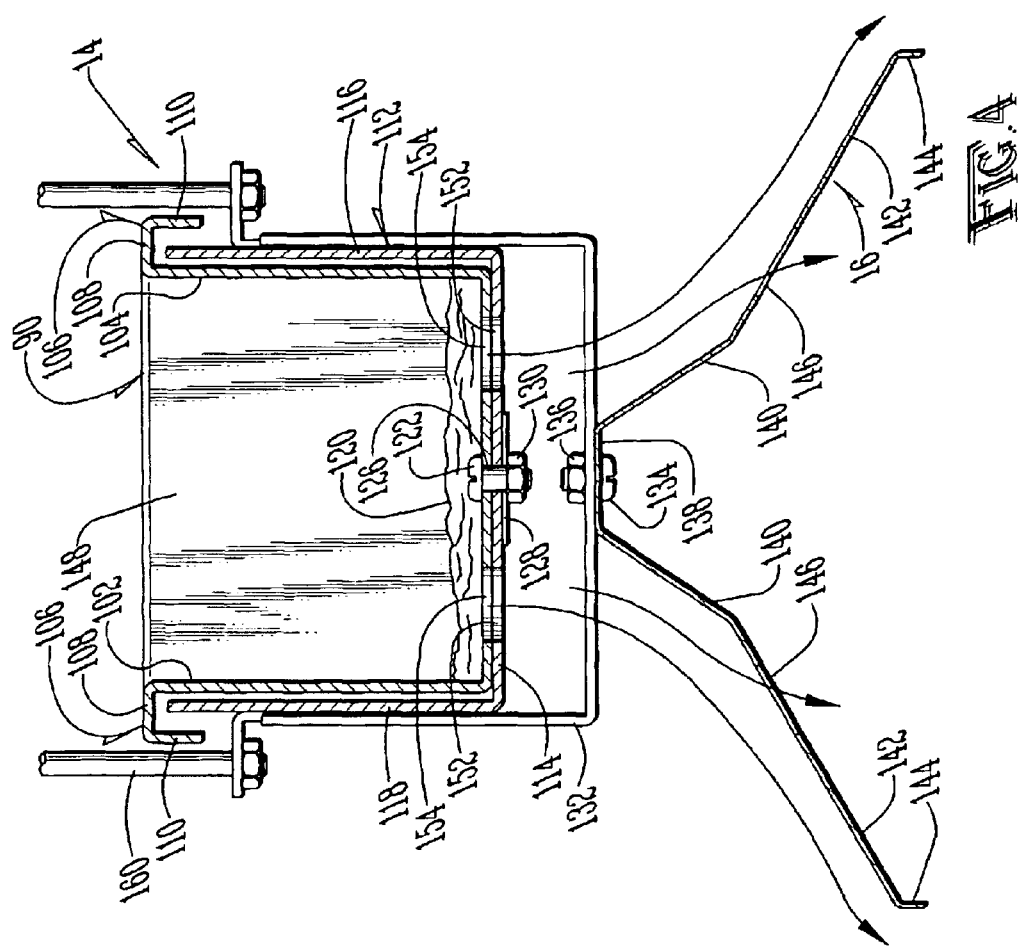
FIG. 4 illustrates a front perspective view in cross-section taken along line 3—3 of FIG. 1.

As shown in FIG. 4, the inner tray (90) includes a floor (100) integrally extruded of 0.625 inch thick aluminum, with a first sidewall (102) and a second sidewall (104). The sidewalls (102) and (104) are each provided with a lip (106) having a cover (108) and a drop (110).

As shown in FIG. 4, the feed assembly (14) is also provided with an outer tray (112). The outer tray (112) is constructed with a floor (114), a first sidewall (116), and a second sidewall (118). While the outer tray (112) may be constructed of any suitable dimension, in the preferred embodiment the outer tray (112) is constructed so as to allow the inner tray (90) to freely slide within the outer tray (112), while allowing the lips (106) of the sidewalls (102) and (104) of the inner tray (90) to extend over and cover the sidewalls (116) and (118) of the outer tray (112), so as to prevent the ingress of food particulate (120), such as that known in the art for feeding fish such as trout and the like, between the sidewalls (102) and (104) of the inner tray (90) and the sidewalls (116) and (118) of the outer tray (112). In the preferred embodiment, the inner tray (90) and outer tray (112) are coated with Teflon® or a similar low-friction material to allow the inner tray (90) to slide within the outer tray (112) with a minimum of friction.

As shown in FIGS. 3 and 4, two screws (122) and (124) are provided through the floor (100) of the inner tray (90). The screws (122) and (124) extend through one inch slots (126) formed in the floor (114) of the outer tray (112). Provided over the screws (122) and (124) are washers (128), secured in place by nuts (130). The nuts (130) are preferably tightened sufficiently on the screws (122) and (124) to allow the inner tray (90) to slide collinearly with the outer tray (112), while maintaining the floor (100) of the inner tray (90) in contact with the floor (114) of the outer tray (112).

As shown in FIGS. 1 and 4, secured to the outer tray (112) are a pair of brackets (132). The brackets (132) are preferably constructed of stainless steel or similar material, and are bolted, welded or otherwise secured to the outer tray (112). As shown in FIG. 4, the brackets are coupled to the spreader (16) by screws (134) and nuts (136), preferably depending the spreader (16) one inch below the floor (114) of the outer tray (112). Although the spreader (16) may be of any suitable construction, in the preferred embodiment the spreader is provided with a ceiling (138) 0.875 inches in width, bending downward sixty-four degrees into a pair of two-inch shoulders (140) which bend upward thirty-three degrees into five and one-half inch arms (142) before bending downward fifty-nine degrees into a pair of drops (144). Again, while the spreader (16) may be of any suitable dimensions, in the preferred embodiment the spreader (16) is integrally formed of a single sheet of aluminum 0.4 inches in thickness. As shown in FIG. 1, the arms (142) of the spreader (16) are preferably provided with a plurality of holes (146) which, while in the preferred embodiment are 0.875 inches in diameter on 1½ inch centers may be of any suitable dimensions, number or orientation.

As shown in FIG. 3, the inner tray (90) is provided with an end cap (148) which is bolted or otherwise secured to the sidewalls (102) and (104) in a manner which prevents food particulate (120) from passing from the inner tray (90) to the outer tray (112), past the end cap (148). Similarly, the outer tray (112) is provided with an end cap (150) of a similar construction. However, while the end cap (148) of the inner tray (90) is secured to the interior surfaces of the sidewalls (102) and (104) of the inner tray (90), the end cap (150) of the outer tray (112) is secured to the exterior surfaces of the sidewalls (116) and (118) of the outer tray (112) to allow the inner tray (90) to extend to the end of the outer tray (112), thereby reducing the cost and weight of the fish feeder (10), while minimizing space requirements for its use. As shown in FIG. 3, the floor (100) of the inner tray (90) is provided with a plurality of holes (152). Similarly, the floor (114) of the outer tray (112) is also provided with a plurality of holes (154). The holes (152) and (154) of both floors (100) and (114) are preferably provided in two rows with the holes (152) and (154) being of ½ inch diameter, evenly staggered on 2 inch centers along the length of the floors (100) and (114). In the preferred embodiment, when the inner tray (90) is extended to place the end cap (148) of the inner tray (90) in contact with the end cap (150) of the outer tray (112), the holes (152) and (154) are all in alignment, and in fluid communication with one another. The trays (90) and (112) may be of any suitable dimensions. In the preferred embodiment, the inner tray is 2½ inches between sidewalls (102) and (104), and is twelve feet long. It should be noted, of course, that the trays (90) and (112) may be of any suitable dimension, but are preferably less than twenty feet in length. Although the fish feeder (10) may be mounted by any method known in the art, in the preferred embodiment the fish feeder (10) is provided with wire hangars (160) pivotally secured to the outer tray (112).

When it is desired to operate the fish feeder (10) of the present invention, the nuts (94) and (98) are loosened and the foot bracket (88) adjusted relative to the connecting shaft (84), so that as the pneumatic cylinder (26) is actuated, the fluid communication between the holes (152) and (154) is suitable for the amount of food particulate (120) desired to be fed. Preferably, the fluid communication between the holes (152) and (154) upon actuation of the pneumatic cylinder (26) is very small when the fish are small, and is steadily increased using the nuts (94) and (98) and the connecting shaft (84) until the full grown fish are fed utilizing a full fluid communication between the holes (152) and (154). Once the connecting shaft (84) has been properly adjusted, the food particulate (120) is positioned within the inner tray (90). Although only a small amount of food particulate (120) is shown within the inner tray (90) in FIG. 4, the entire tray (90) may be filled.

Thereafter, the power supply (72) is coupled to the outlet (74) and the switch (68) actuated to drive the connecting shaft (84) and inner tray (90) toward the end cap (150) of the outer tray (112) for a predetermined time, preferably less than one second, before the switch (68) is again actuated to drive the inner tray (90) away from the end cap (150) of the outer tray (112). Although the driving force may be of any suitable power, in the preferred embodiment, preferably one hundred pounds per square inch of pressurized air (66) is provided to the pneumatic cylinder (26) to produce three hundred pounds of driving force and two hundred seventy pounds of return force. Preferably, the pneumatic cylinder drives the inner tray (90) with one hundred pounds of force in each direction, more preferably, at least one hundred fifty pounds of force in each direction, and most preferably at least two hundred pounds of force in each direction.

Alternatively, the switch (68) may be electrically coupled to a timer (156) or a central processing unit (158), such as those well known in the art to automatically trigger the pneumatic cylinder (26) to alternately drive and return the inner tray (90) to release a predetermined amount of food particulate (120) onto the spreader (16). When the switch (68) is actuated, the solenoid (64) opens the pneumatic valve (56) to allow the pressurized air (66) to move through the input tube (58) and through the second pneumatic tube (50) into the second chamber (54). The increase and the pressure within the second chamber (54) drives the piston (36) and connecting shaft (84) which, in turn, drives the inner tray (90). Conversely, when the switch is activated in reverse, the solenoid (64) triggers the pneumatic valve (56) to direct the pressurized air through the first pneumatic tube (48) into the first chamber (52), thereby driving the piston (36) to draw the inner tray (90) toward its original position. As the piston (36) moves, the piston (36) drives the pressurized air (66) out through the second pneumatic tube (50) through the pneumatic valve (56) and out the exhaust (62). After the pneumatic cylinder (26) has driven the inner tray (90) in both directions, the food particulate (120) falls onto the shoulders (140) of the spreader (16).

The arms (142) of the spreader (16) direct the food particulate (120) outward. While some of the food particulate (120) falls through the holes (146) in the arms (142) of the spreader (16), another portion of the food particulate (120) extends down the arms (142) of the spreader (16) to fall over the edge of the drops (144) of the spreader (16). In this manner, the food particulate is evenly distributed over the surface of the water (not shown) to provide the fish (not shown) with an evenly dispersed feeding, assuring all fish are fed and reducing waste and water pollution and costs associated with overfeeding.

Although the invention has been described with respect to a preferred embodiment thereof, it is also to be understood that it is not to be so limited, since changes and modifications can be made therein which are within the full intended scope of this invention as defined by the appended claims.

What is claimed is:

1. A fish feeder comprising:
   (a) an elongate tray comprising:
      (i) a first floor defining a plurality of openings;
      (ii) a first sidewall coupled to said first floor; and
      (iii) a second sidewall coupled to said first floor,
   (b) a second floor defining a plurality of openings;
   (c) means for maintaining said second floor in a substantially parallel orientation to said first floor;
   (d) a shaft operably coupled to said second floor;
   (e) a pneumatic cylinder provided around said shaft;
   (f) a pressurized air supply coupled to said cylinder;
   (g) an exhaust coupled to said pneumatic cylinder; and
   (h) means for directing air from said pressurized air supply to said pneumatic cylinder in a first manner which moves said shaft and said second floor in a first direction and for directing air from said pressurized air supply to said pneumatic cylinder in a second manner which moves said shaft and said second floor in a second direction, wherein said first direction is substantially opposite said first direction.

2. The fish feeder of claim 1, further comprising a third sidewall coupled to said second floor and a fourth sidewall secured to said second floor.

3. The fish feeder of claim 2, wherein said first floor, said first sidewall and said second sidewall form a first tray, wherein said second floor, said third sidewall and said fourth sidewall form a second tray, and wherein said second tray is provided within said tray.

4. The fish feeder of claim 3, further comprising a rail secured to said third sidewall, said rail extending over and down a portion of said first sidewall when said second tray is positioned within said first tray.

5. The fish feeder of claim 3, further comprising an end wall secured to said second floor.

6. The fish feeder of claim 5, further comprising means for adjusting a position of said second floor relative to said first floor.

7. The fish feeder of claim 6, wherein said adjusting means is means for adjusting said second floor for travel of an end of said second floor to within five centimeters of an end of said first floor.

8. The fish feeder of claim 1, further comprising a shaft secured to said second floor, wherein said first floor defines a slot through which said shaft extends.

9. The fish feeder of claim 8, further comprising means secured to said shaft for preventing removal of said shaft from said slot.

10. The fish feeder of claim 1, further comprising means for reducing the sound of the actuation of said pneumatic cylinder below 80 decibels.

11. The fish feeder of claim 10, wherein said reducing means is a resilient shock absorber operably coupled to said pneumatic cylinder.

12. The fish feeder of claim 1, wherein said directing means is means for directing a sufficient amount of air to said pneumatic cylinder to drive said shaft with at least fifty (50) pounds of force.

13. The fish feeder of claim 1, wherein said directing means is means for directing a sufficient amount of air to said pneumatic cylinder to drive said shaft with at least one hundred (100) pounds of force.

14. The fish feeder of claim 1, wherein said directing means is means for directing a sufficient amount of air to said pneumatic cylinder to drive said shaft with at least one hundred fifty (150) pounds of force.

15. The fish feeder of claim 1, wherein said directing means is means for directing a sufficient amount of air to said pneumatic cylinder to drive said shaft with at least two hundred (200) pounds of force.

16. A fish feeder comprising:
   (a) a first tray comprising:
      (i) a first floor defining a plurality of openings;
      (ii) a first sidewall coupled to said first floor;
      (iii) a second sidewall coupled to said first floor; and
      (iv) a first end plate.
   (b) a second tray comprising:
      (i) a second floor defining a plurality of openings;
      (ii) a third sidewall coupled to said second floor, extending upward along a first side of said first sidewall;
      (iii) a fourth sidewall coupled to said second floor, extending upward along a first side of said second sidewall; and
      (iv) a second end plate.
   (c) means for moving said second end plate to within five centimeters of said first end plate and for moving said second end plate away from said first end plate.

17. The fish feeder of claim 16, wherein said moving means is located at least ten centimeters from said first end plate.

18. The fish feeder of claim 16, wherein said moving means is a pneumatic cylinder.

19. The fish feeder of claim 18, wherein said pneumatic cylinder produces less than 80 decibels of noise and at least one hundred pounds of force when actuated.

20. A fish feeder comprising:
   (a) a first tray comprising:
      (i) a first floor defining a plurality of openings;
      (ii) a first sidewall coupled to said first floor; and
      (iii) a second sidewall coupled to said first floor,
   (b) a second tray comprising:
      (i) a second floor defining a plurality of openings;
      (ii) a third sidewall coupled to said second floor; and
      (iii) a fourth sidewall coupled to said second floor,
   (c) wherein said second tray is positioned within said first tray;
   (d) means for moving said second tray relative to said first tray;
   (e) a first shield coupled to said third sidewall and extending over said first sidewall; and
   (f) a second shield coupled to said fourth sidewall and extending over said second sidewall.

* * * * *